United States Patent
Hinque et al.

(10) Patent No.: US 9,050,858 B2
(45) Date of Patent: Jun. 9, 2015

(54) PERISTALTIC PUMP AIR MAINTENANCE TIRE

(71) Applicant: The Goodyear Tire & Rubber Company, Akron, OH (US)

(72) Inventors: Daniel Paul Luc Marie Hinque, Habay-la-Neuve (BE); Jean-Claude Patrice Philippe Griffoin, Mertzig (LU); Lois Levy, Luxembourg (LU); Gilles Bonnet, Niederfeulen (LU); Jean Joseph Victor Collette, Arlon (BE); Marcel Przibilla, Vianden (LU); Massimo Di Giacomo Russo, Kehlen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 278 days.

(21) Appl. No.: 13/778,228

(22) Filed: Feb. 27, 2013

(65) Prior Publication Data
US 2014/0166174 A1 Jun. 19, 2014

Related U.S. Application Data

(60) Provisional application No. 61/738,591, filed on Dec. 18, 2012.

(51) Int. Cl.
*B60C 23/12* (2006.01)
*B60C 19/00* (2006.01)

(52) U.S. Cl.
CPC .......... *B60C 19/00* (2013.01); *Y10T 152/10495* (2015.01); *B60C 23/12* (2013.01)

(58) Field of Classification Search
CPC ................................ B60C 23/10; B60C 23/12
USPC .......................................... 152/419, 423–426
See application file for complete search history.

(56) References Cited

U.S. PATENT DOCUMENTS

| | | | |
|---|---|---|---|
| 1,050,886 A | | 1/1913 | Wetherell |
| 1,134,361 A | * | 4/1915 | Wetherell ........................ 152/426 |
| 3,304,981 A | * | 2/1967 | Sheppard ........................ 152/426 |
| 7,225,845 B2 | * | 6/2007 | Ellmann ........................ 152/426 |
| 8,042,586 B2 | * | 10/2011 | Losey et al. .................... 152/426 |
| 8,113,254 B2 | | 2/2012 | Benedict ........................ 152/426 |

FOREIGN PATENT DOCUMENTS

| | | |
|---|---|---|
| EP | 2025535 A2 | 2/2009 |
| EP | 2565061 A1 | 3/2013 |

OTHER PUBLICATIONS

EPO Search report received by Applicants on Aug. 8, 2014.

* cited by examiner

*Primary Examiner* — Jason Bellinger
(74) *Attorney, Agent, or Firm* — Richard B. O'Planick (57) ABSTRACT

The invention relates generally to air maintenance tires and, more specifically, to a pump mechanism for supplying air into such tires.

3 Claims, 11 Drawing Sheets

PERISTALTIC PUMP AIR MAINTENANCE TIRE

FIELD OF THE INVENTION

The invention relates generally to air maintenance tires and, more specifically, to a pump mechanism for supplying air into such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

SUMMARY OF THE INVENTION

In one aspect of the invention, an annular air passageway is integrally formed and enclosed within a tire sidewall and forms one or more loop(s) circumscribing the tire sidewall. The air passageway progressively flattens segment by segment from a rolling tire closing patch causing air to be pumped progressively along the air passageway. An inlet air passageway portal and an outlet air passageway portal are positioned along the annular passageway in proximal relationship operative to place the inlet air passageway portal and the outlet air passageway portal within a common passageway segment closing patch as the tire rotates.

In another aspect, the inlet air passageway portal and the outlet air passageway portal are located at respective inlet and outlet air passageway ends in an offset relationship. The offset may take the form of placing the inlet and outlet portals in a diagonally offset relationship or, alternatively, a relationship in which the portals are adjacent and axially offset or adjacent and radially superimposed.

According to a further aspect, the air passageway forms multiple loops or turns that circumscribe the tire sidewall between inlet and outlet ends of the air passageway.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

U.S. Pat. No. 8,113,254, entitled "Self-Inflating Tire", issued Feb. 14, 2012, incorporated herein by reference, teaches a closed loop peristaltic air maintenance tire assembly in which a closed loop tube insert mounts into a tire sidewall groove in a post-cure assembly procedure. Air is admitted into the tube air passageway through an inlet portal and exits from the tube from an outlet port into the tire cavity. The tube progressively flattens segment by segment as the tire rotates to pump air from outside the tire along the air tube passageway and to the tire cavity. The insertion of the annular tube insert into a sidewall groove limits the geometric configuration of the tube insert to a one plane, single loop form. Once inserted into a sidewall groove, the closed loop tube circumscribes the tire sidewall. The inlet and outlet portals of the system are fitted with inlet and outlet valves positioned 180 degrees apart along the tube insert.

Figure 1:
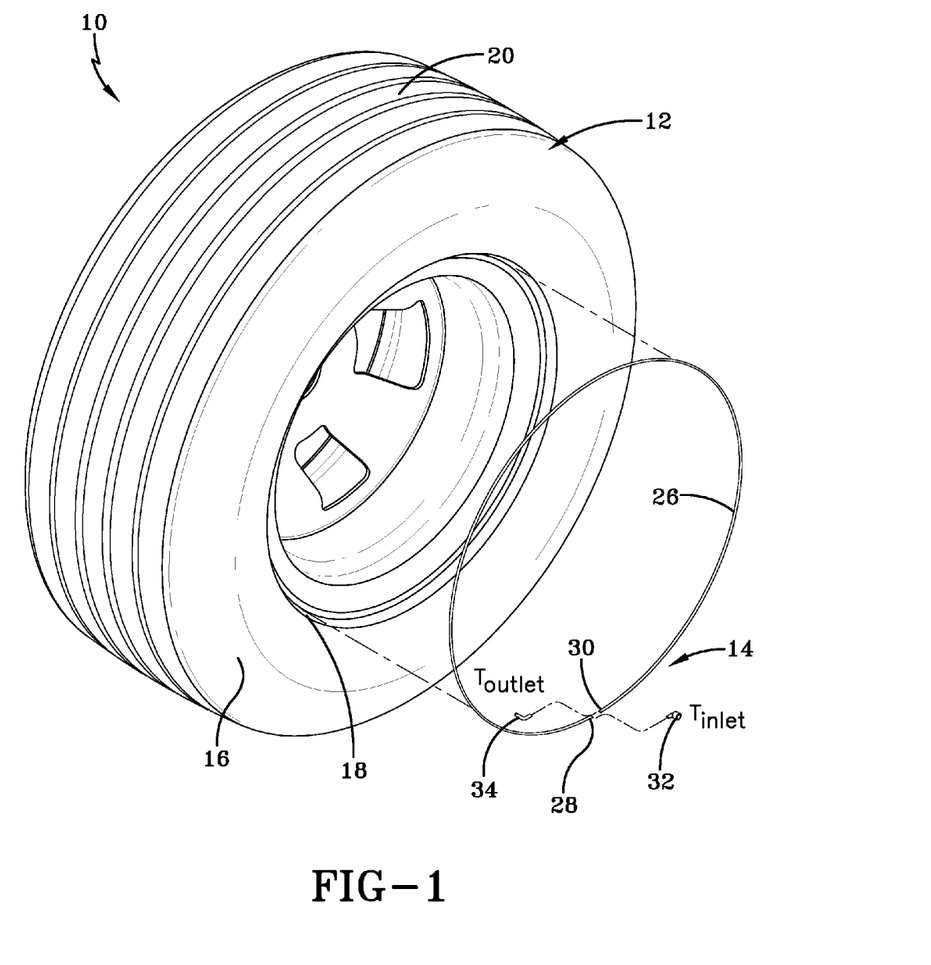
FIG. 1 is an isometric view of tire, rim and peristaltic pump tube.
Figure 2:
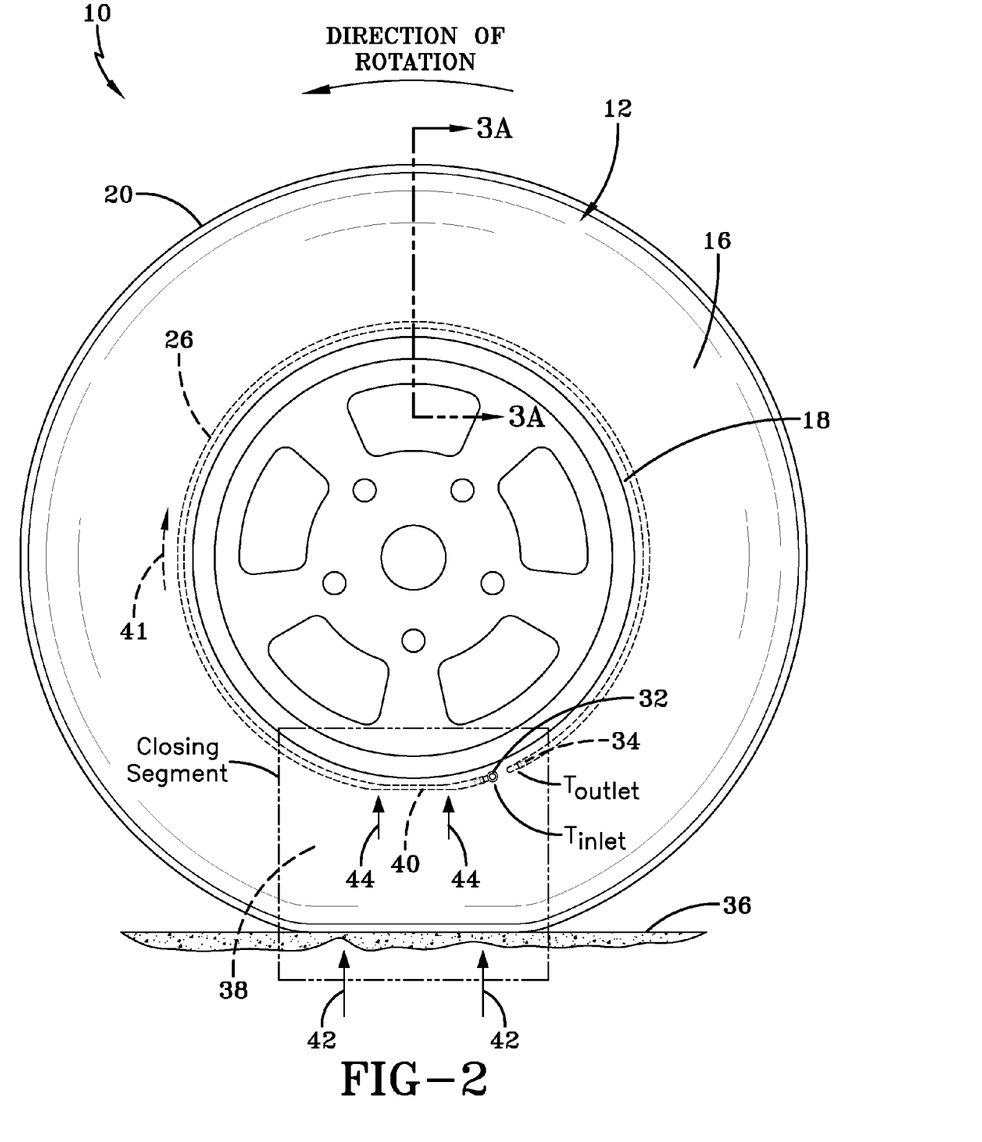
FIG. 2 is a side view of tire with location of tubing and inlet and outlet portal location with the tire rotating against a ground surface
Figure 3A:
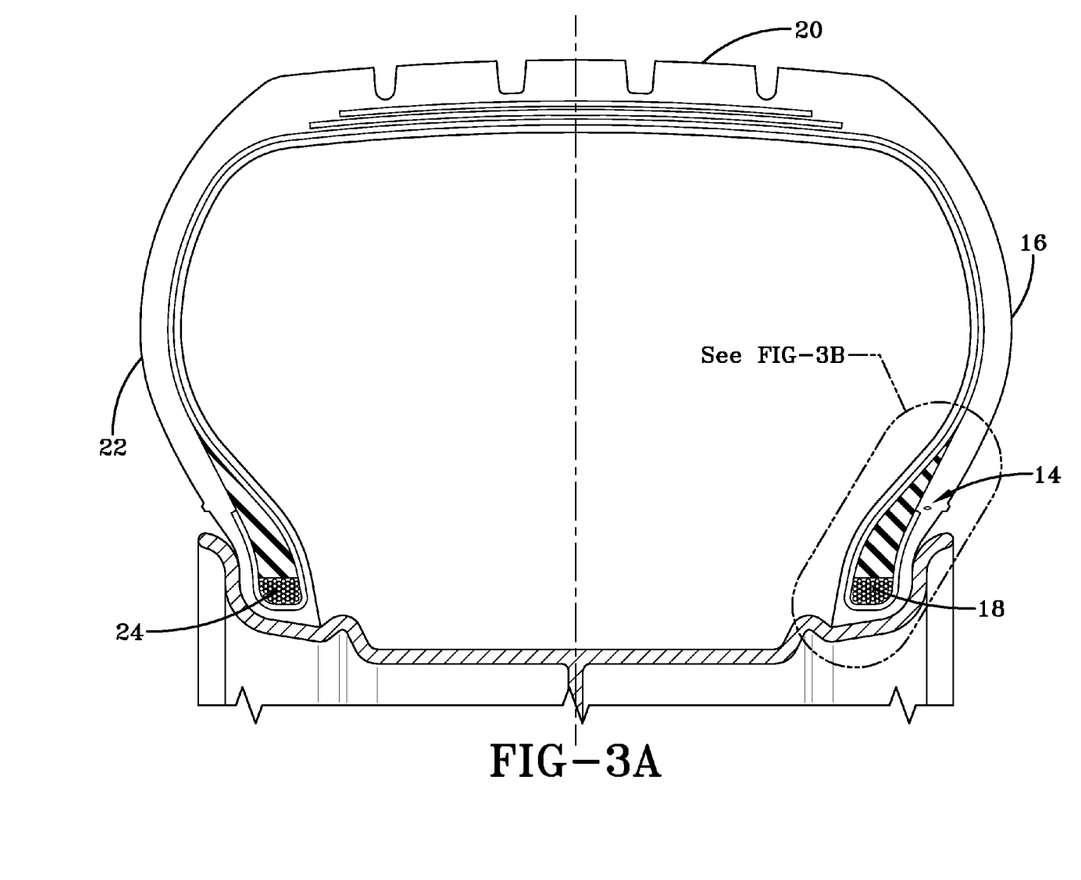
FIG. 3A is a sectional view taken along the line 3A-3A of FIG. 2.
Figure 3B:
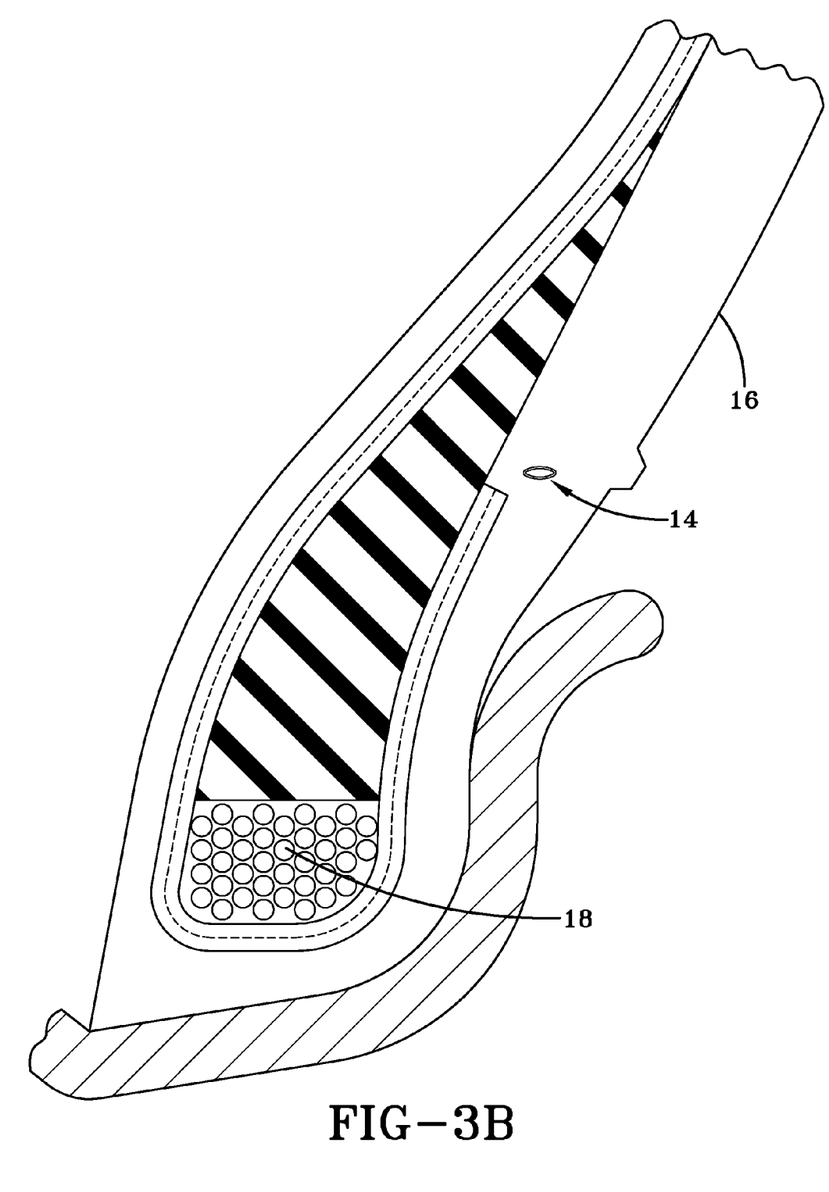
FIG. 3B is enlarged sectional view of the tire sidewall and tube location region as identified in FIG. 3A.

Referring initially to FIGS. 1, 2, 3A and 3B, the subject invention is directed to a built-in peristaltic air maintenance tire assembly in which an air passageway is formed within a tire sidewall during tire build. The geometric form of the air passageway is not one dimensional as with the system of U.S. Pat. No. 8,113,254. In the air pumping system of FIGS. 1, 2, 3A and 3B, a peristaltic air maintenance tire assembly 10 is shown to include a tire 12 and an air pumping built-in peristaltic pumping assembly 14. The tire is of conventional construction having a pair of tire sidewalls 16, 22 extending respectively from bead regions 18, 24 to a crown or tread region 20. The tire during tire build is adapted to incorporate a peristaltic air passageway 26 built in to one or both of the tire sidewalls 16, 22. The built-in air passageway 26 pumps air from outside of the tire along the passageway and into the tire cavity from pumping actuation force generated from rotational movement of the tire. FIGS. 3A and 3B show the lower sidewall location of the air passageway 26 above the bead region 18.

The air passageway 26 forms one or more loops within the sidewall 16 as will be explained and generally circumscribes a lower region of the sidewall 16 above the bead region 18. A discontinuity in the air passageway forms a gap between opposite passageway end holes 28, 30. The end holes 28, 30 of the passageway are closely adjacent and represent inlet and outlet holes or portals by which air enters and exits the passageway 14. Within the end holes 28, 30, respectively, inlet and outlet valves 32, 34 are mounted, as indicated by $T_{inlet}$ and $T_{outlet}$ at FIG. 1, the inlet valve 32 communicating with air outside of the tire and the outlet valve 34 directing air from within the passageway 14 to the tire cavity. Valve construction and configuration are shown in U.S. Pat. No. 8,042,586, entitled "Self-Inflating Tire Assembly" incorporated herein by reference.

As shown in FIG. 2, when the tire 12 rotates against a ground surface 36, regions of the tread 20 progressively engage the ground and form a footprint or, as herein referred, a closing segment 38. Forces 40 generated from engagement of closing segment 38 with ground surface 36 are radially directed into the tire and into the sidewall 16 to the air passageway 26. Such forces directed as shown by numeral 44 encounter and flatten a segment 40 of the passageway 26. Further rotation of the tire in the direction indicated causes the passageway 26 within sidewall 16 to flatten segment by segment, thereby forcing air along the passageway from the inlet hole or portal 28 to the outlet hole or portal 30 as shown by directional arrow 41.

It will be seen that the holes 28, 30 are proximally located within the sidewall such that the inlet and outlet holes are located simultaneously in the air passageway closing patch 38. It will further be noted as explained that the length of the air passageway 26 may be adjusted so that several loops or rounds are created along the circumference of the tire sidewall 16. "A tube angle" is formed, defined as n*360 degrees and represents the number of complete rounds or loops created by the air passageway 26 within the sidewall 16. A "closing patch angle" is the portion of a 360 degree round represented by the closing patch segment 38. The air passageway length may be adjusted to adjust the relative proximity between the inlet and outlet holes, thereby ensuring that the holes 28, 30 will be located simultaneously in a common passageway closing patch 38 as the tire rotates.

Figures 4A, 4B:
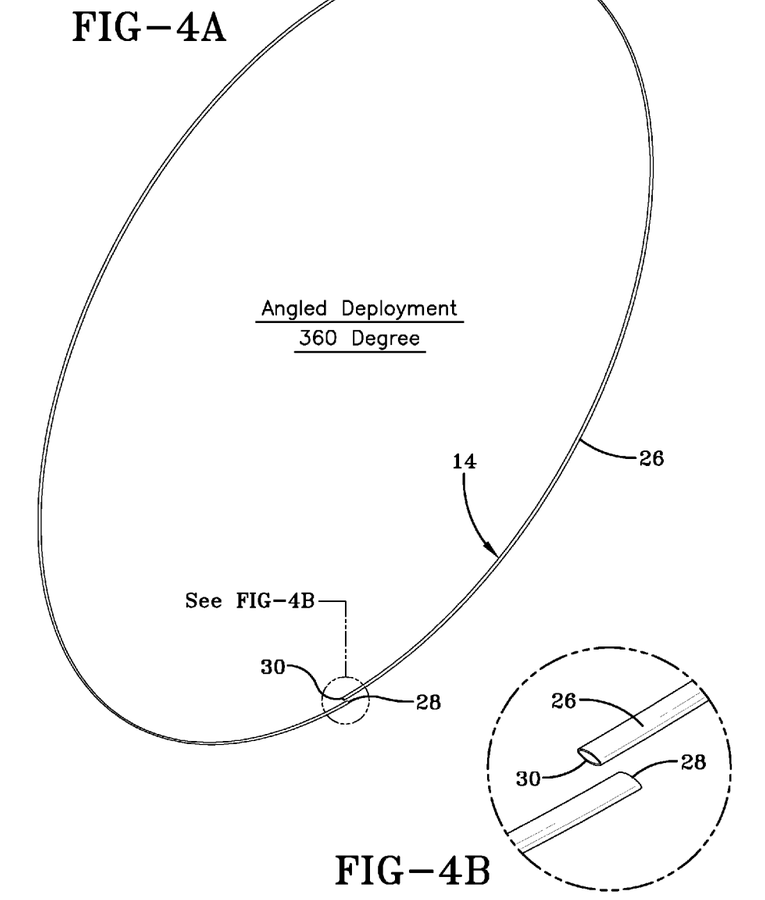
FIG. 4A is a 360 degree peristaltic tube configuration showing angled deployment.
FIG. 4B is an enlarged perspective view of the ends of the tube of FIG. 4A.
Figures 5, 6:
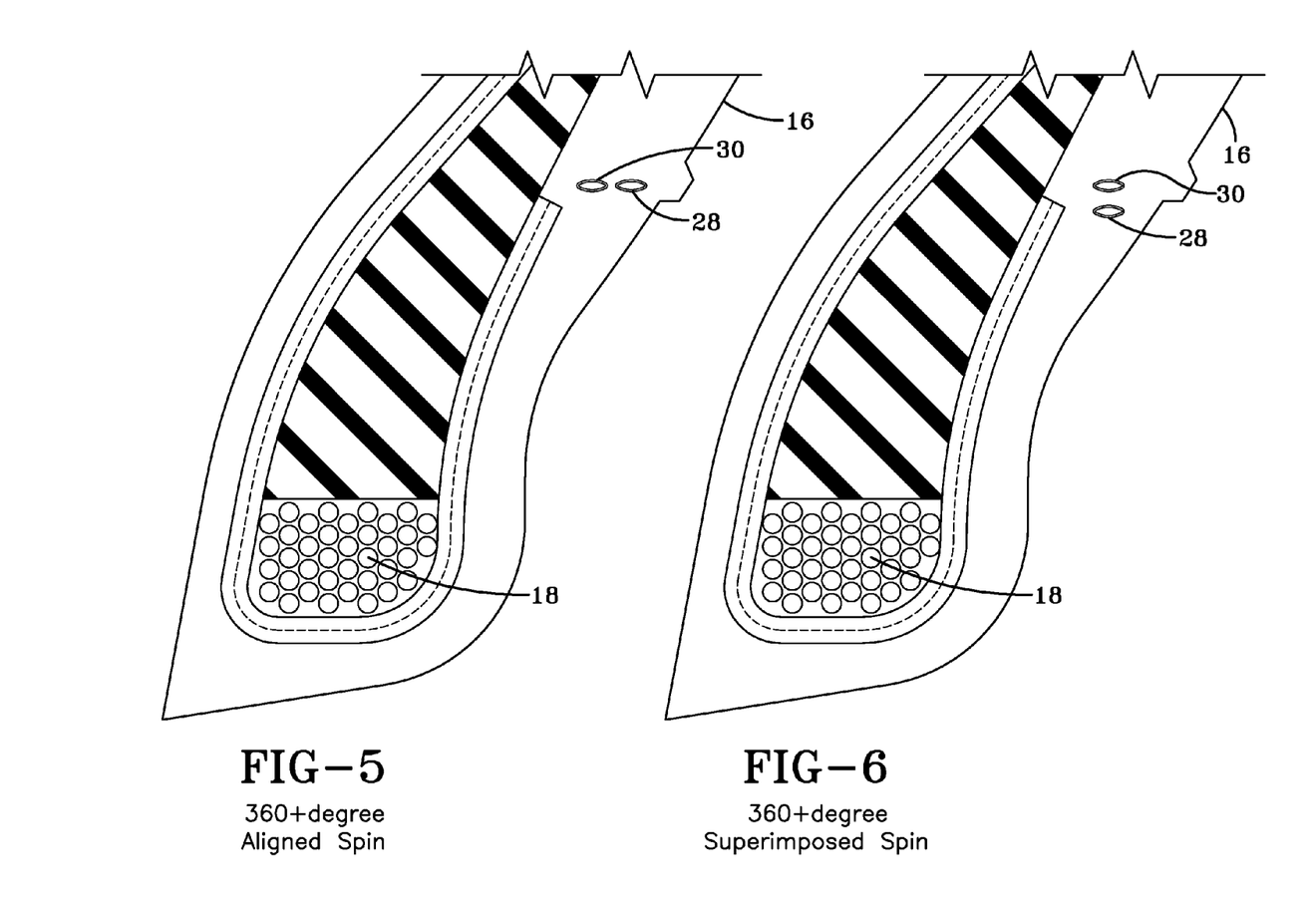
FIG. 5 is a sectional view through a tire sidewall region showing a 360 degree peristaltic tube mounted in an aligned spin orientation.
FIG. 6 is a sectional view through a tire sidewall region showing a 360 degree peristaltic tube mounted in a superimposed spin orientation.
Figures 7, 8:
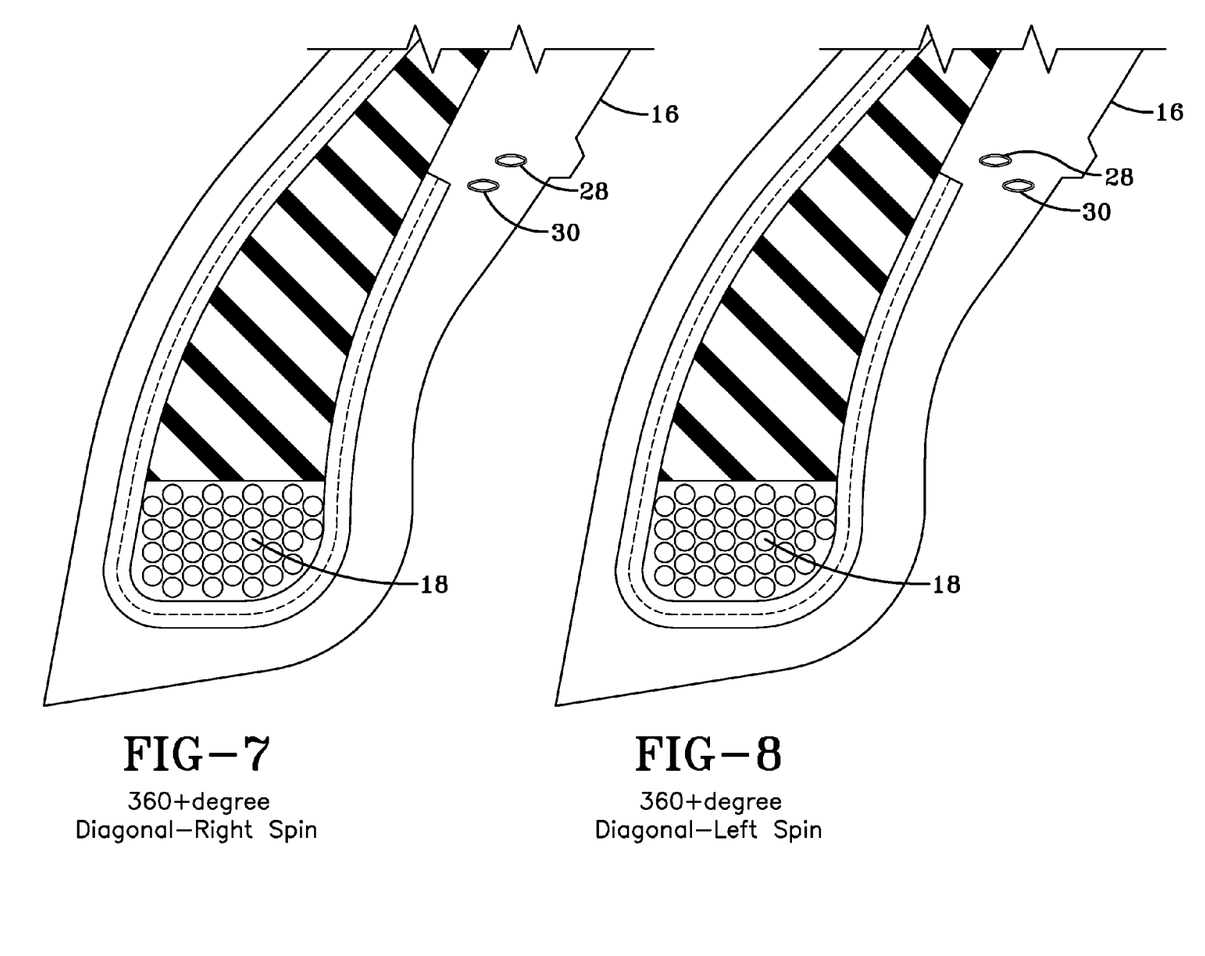
FIG. 7 is a sectional view through a tire sidewall region showing a 360 degree peristaltic tube mounted in a diagonal-right spin orientation.
FIG. 8 is a sectional view through a tire sidewall region showing a 360 degree peristaltic tube mounted in a diagonal-left spin orientation.

The air passageway angle is defined as n*360 degrees where "n" represents the number of rounds or loops of the passageway along the circumference of the tire. In the single loop or round embodiment shown in FIGS. 4A and 4B, the air passageway in an angled deployment of 360 degrees. The end holes 28, 30 of the air passageway 26 may be positioned as shown to be offset with respect to each other while residing within a common closing patch segment of a rotating tire. In FIG. 4B, and FIG. 5 it will be seen that the 360 degree loop terminates with the end holes 28, 30 in a side by side aligned relationship in cross-section. Such a configuration is referred to herein as a "360+degree-type having an aligned spin". An alternative 360 degree spin or loop configuration is shown in FIG. 6 wherein the end holes 28, 30 are superimposed, and thus the passageway orientation of FIG. 6 is referred to herein as a "360+degree Superimposed Spin". In FIG. 7, the loop is configured to bring the end holes together at a diagonally offset relationship. FIG. 7 shows a 360+degree Diagonal-Right Spin configuration and FIG. 8 shows a 360+Degree Diagonal-Left Spin configuration. The alternatively configured embodiments set forth in FIGS. 5, 6, 7 and 8 are built into the tire sidewall and function to position the peristaltic pump air passageway in a desired angled deployment while positioning the inlet and outlet holes 28, 30 in close proximity.

Figures 4C, 4D:
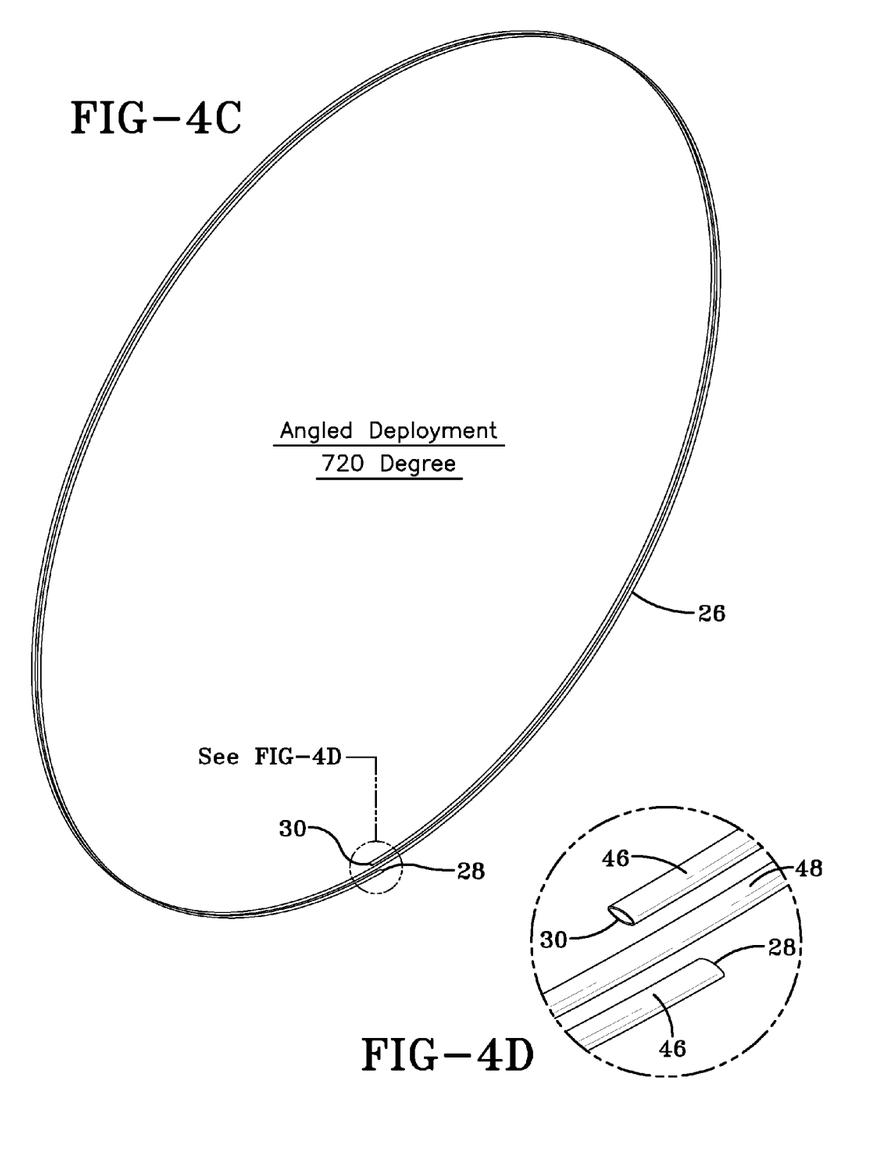
FIG. 4C is a 720 degree peristaltic tube configuration showing angled deployment.
FIG. 4D is an enlarged perspective view of the ends of the tube of FIG. 4C.
Figures 9, 10:
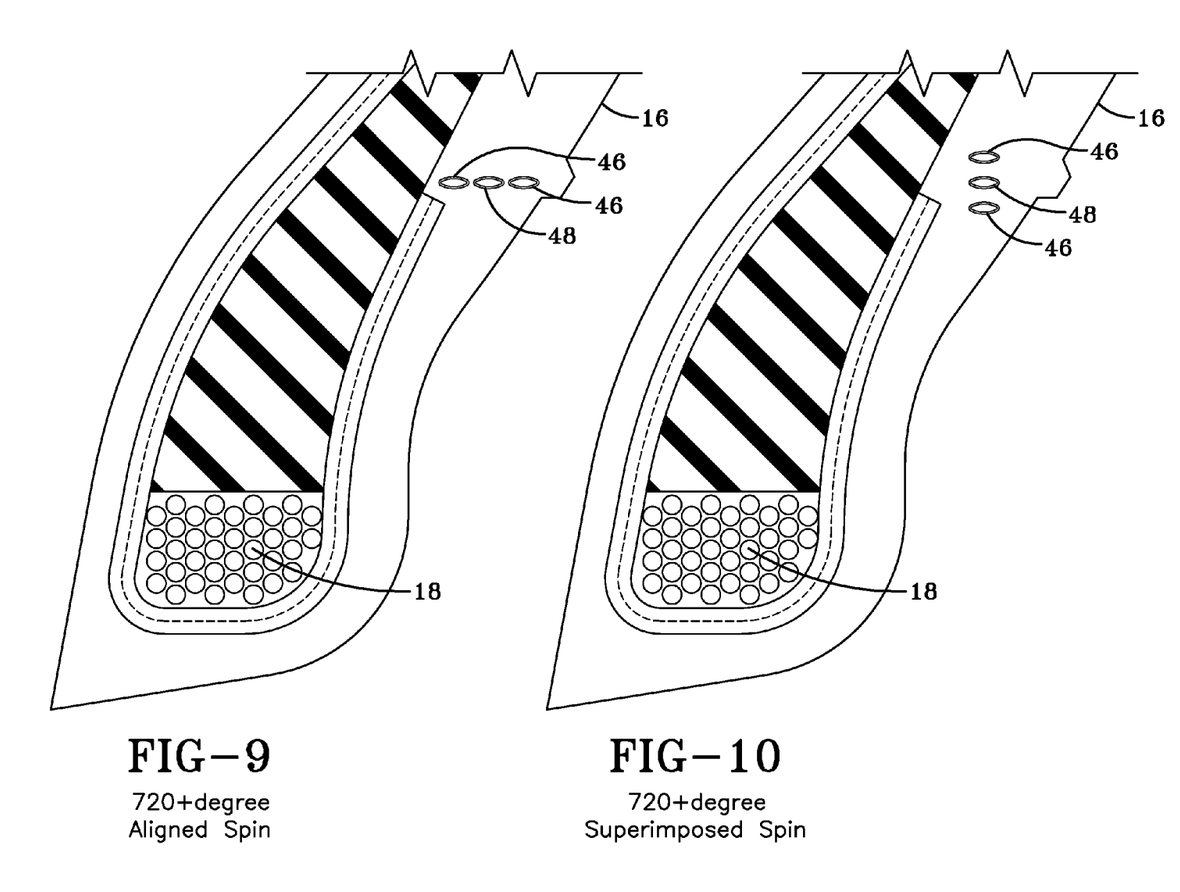
FIG. 9 is a sectional view through a tire sidewall region showing a 720 degree peristaltic tube mounted in an aligned spin orientation.
FIG. 10 is a sectional view through a tire sidewall region showing a 720 degree peristaltic tube mounted in a superimposed spin orientation.
Figures 11, 12:
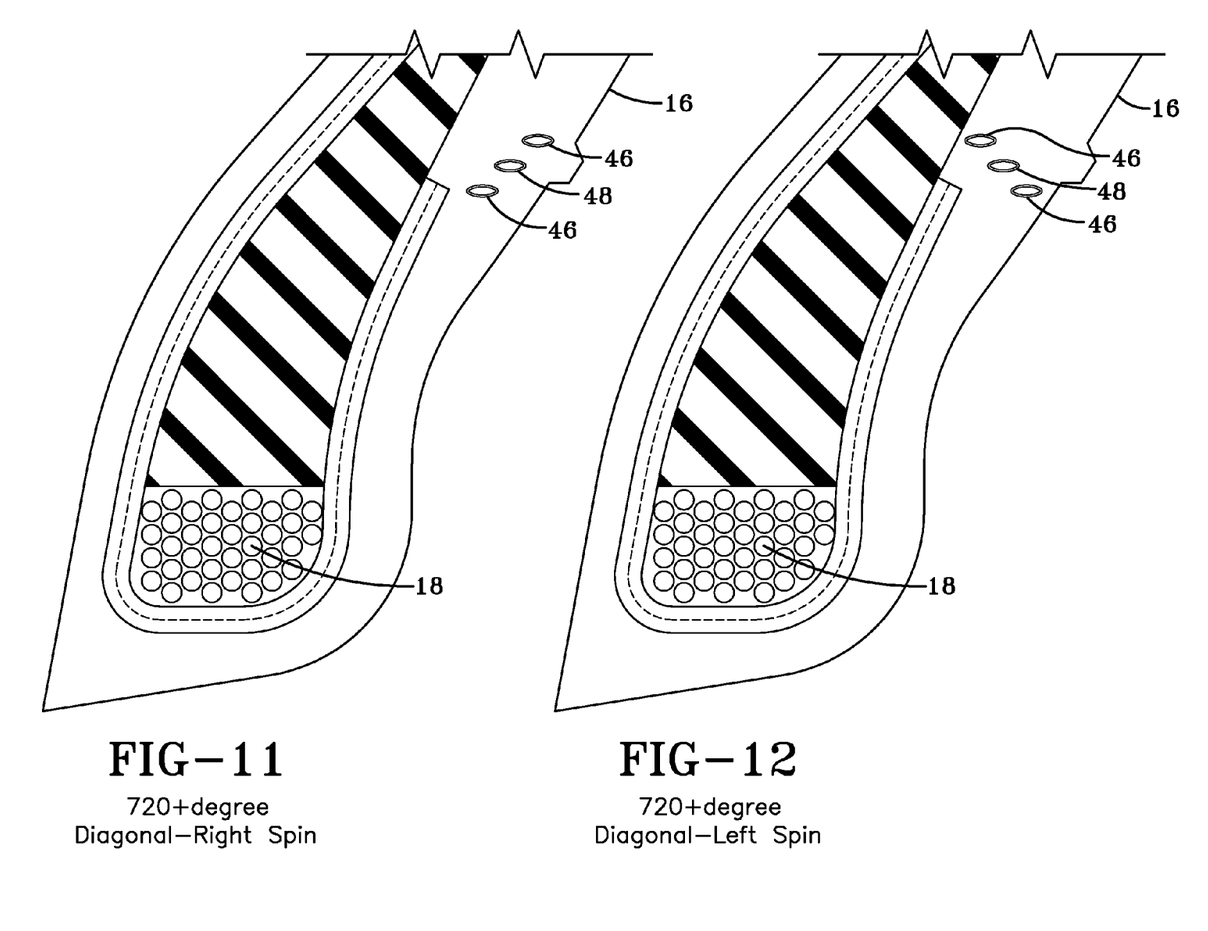
FIG. 11 is a sectional view through a tire sidewall region showing a 720 degree peristaltic tube mounted in a diagonal-right spin orientation.
FIG. 12 is a sectional view through a tire sidewall region showing a 720 degree peristaltic tube mounted in a diagonal-left spin orientation.

The angle deployment configuration of the air passageway 26 may be altered into further alternative embodiments by adjusting the length of the passageway and the number of spins or loops created by the air passageway in the sidewall. The single spin or 360 Degree Angled Deployment configuration, as explained previously, is shown in FIGS. 4A and 4B. In FIGS. 4C and 4D, an Angled Deployment 720 Degree alternative configuration for the air passageway is shown wherein the passageway forms two spins or loops 46, 48 along the circumference of the tire sidewall 16 between end holes 28, 30. The additional length provided results in an increased pumping air volume within the air passageway 26. As with the 360 degree embodiment, the 720 degree embodiment may be configured in several spin orientations as shown in FIGS. 9, 10, 11 and 12. FIG. 9 represents a 720+Degree Aligned Spin orientation, FIG. 10 a 720+Degree Superimposed Spin orientation, FIG. 11 a 720+Degree Diagonal-Right Spin orientation and FIG. 12 a 720+Degree Diagonal-Left Spin orientation. The 720 degree embodiments and orientations likewise conclude with the inlet and the outlet holes 28, 30 being positioned in close proximity such that both inlet and outlet ends are within a common closing patch segment of a rotating tire.

Figures 4E, 4F:
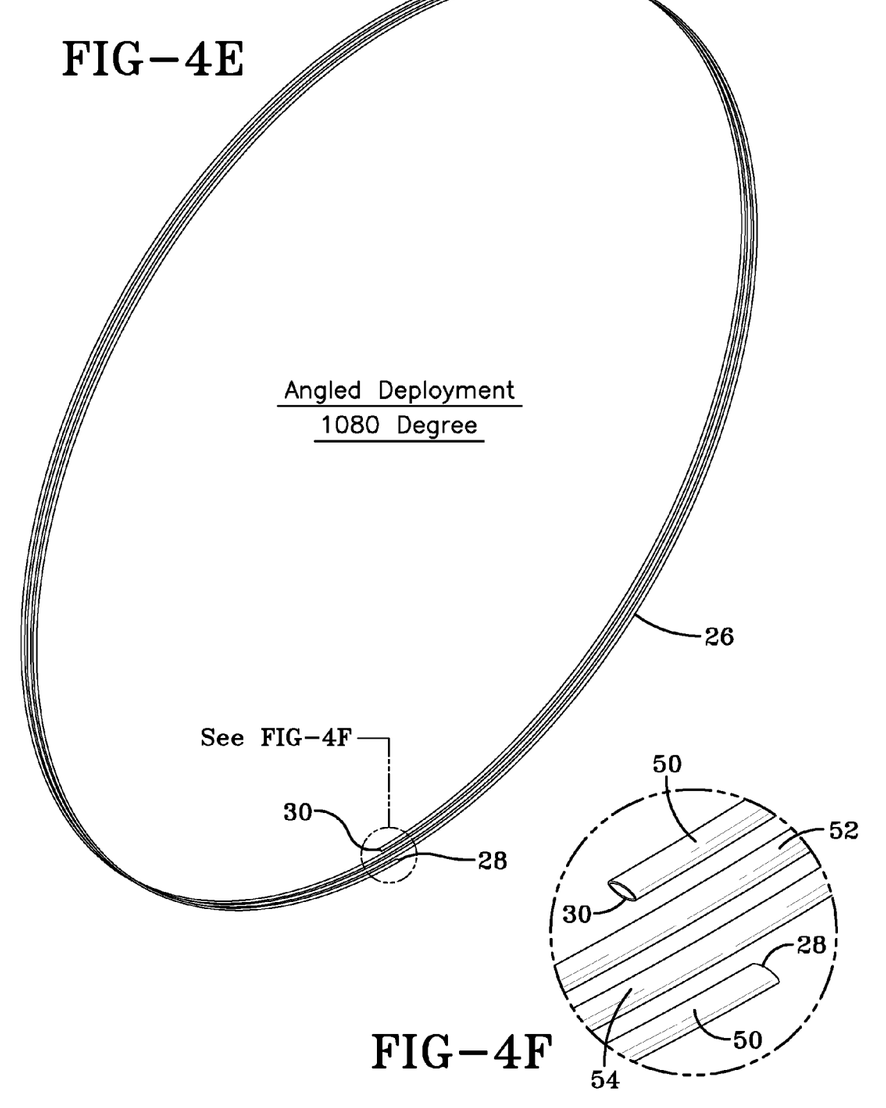
FIG. 4E is a 1080 degree peristaltic tube configuration showing angled deployment.
FIG. 4F is an enlarged perspective view of the ends of the tube of FIG. 4E.

In FIGS. 4E and 4F, an Angled Deployment 1080 Degree alternative configuration for the air passageway is shown wherein the passageway forms three spins or loops 50, 52, 54 along the circumference of the tire sidewall between end holes 28, 30. The additional length provided results in an even greater pumping air volume within the air passageway. As with the 360 and 720 degree embodiments, it will be understood that the 1080 degree embodiment may be configured in several spin orientations including a 1080+Degree Aligned Spin orientation, a 1080+Degree Superimposed Spin orientation, a 1080+Degree Diagonal-Right Spin orientation and a 1080+Degree Diagonal-Left Spin orientation (not shown). The 1080 degree embodiments and orientations likewise conclude with the inlet and the outlet holes 28, 30 being positioned in close proximity such that both inlet and outlet ends are within a common closing patch segment of a rotating tire.

By positioning the inlet and outlet holes 28, 30 simultaneously in a common closing patch segment (38 as shown in FIG. 2), the mass of air that is pumped to a certain pressure within the air passageway 26 is not lost during an incomplete revolution (less than 360 degree tire rotation) cycle. The air within the air passageway 26 is kept within the air passageway 26 for the next cycle and accumulates throughout the re-inflation cycle. The pressure rise within the passageway 26 is a linear line. As soon as the inlet and the outlet holes 28, 30 are located simultaneously in the contact patch segment 38, the pressure rising behavior is linear due to the accumulation of pressurized mass of air in the pump passageway 26 after each non-complete cycle. The capacity of the pump is thus of increased efficiency when compared to a 180 degree passageway configuration. With the tube angle=n*360 degrees, with "n" representing either an integer or non-integer multiplier times a complete revolution, the pressure rising behavior is linear and increasing.

The system described previously will generally have a check valve device at the outlet opening 30 in order to prevent deflation of the tire cavity back through the pump passageway 26. Having several rounds or loops in the passageway configuration 26 serves to prevent:

(1) the tire from deflating through the passageway 26 in the event of anti-return (check valve) failure;

(2) the tire from deflating through the passageway 26 in the event that one of the parts of the passageway within the contact patch segment, i.e. the footprint, is no longer pinched close due to extreme driving conditions such as high cornering, high speeds;

(3) counter-acting changes in terms of compression areas within the tire sidewall region, such as the chafer, due to unexpected events such as road bumps, potholes, etc., which may otherwise cause the pump to leak and lose the accumulated pressurized air; and (5) counter-acting changes in terms of compression areas within the tire sidewall region, such as the tire chafer, due to rim widths variation which would otherwise cause the pump to leak and the accumulated pressurized air to be lost.

Thus, for the reasons above, it is desirable to have the passageway 26 incorporate several turns or loops while maintaining the inlet and outlet openings 28, 30 in close enough proximity so as to occupy simultaneously the same closing patch segment as the tire rotates.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire assembly comprising:

a tire having a tire cavity, sidewalls extending respectively from first and second tire bead regions to a tire tread region;

an annular air passageway integrally formed and enclosed within a tire sidewall and forming at least one loop substantially circumscribing the tire sidewall, the air passageway operative to progressively flatten segment by segment by a rolling tire closing patch, whereby progressively pumping air along the air passageway;

an inlet air passageway portal located at an inlet end of the annular passageway operative to pass air into the annular passageway;

an outlet air passageway portal located at an outlet end of the annular passageway, the outlet air passageway portal operative in an open position to pass air from the annular air passageway;

wherein the inlet air passageway portal and the outlet air passageway portal are located in proximal locations along the air passageway operative to place the inlet air passageway portal and the outlet air passageway portal within a common passageway segment closing patch of the tire as the tire rotates; and wherein the annular passageway comprises a helical passageway formed by a plurality of loops circumscribing the tire sidewall.

2. The tire assembly of claim 1, wherein the inlet and outlet passageway ends are offset at terminal ends of the circular loop.

3. The tire assembly of claim 2, wherein the inlet and outlet passageway ends are in a diagonally offset; adjacent and axially aligned or adjacent and radially superimposed relationship.

* * * * *